(12) United States Patent
Wang et al.

(10) Patent No.: US 12,162,965 B2
(45) Date of Patent: Dec. 10, 2024

(54) SOLUTION POLYMERIZATION PROCESS

(71) Applicant: Dow Global Technologies LLC, Midland, MI (US)

(72) Inventors: Alec Y. Wang, Sugar Land, TX (US); Jorge Rubalcaba, Pearland, TX (US); Michael D. Turner, Sugar Land, TX (US); Michael J. Zogg, Jr., Houston, TX (US); Pradeep Jain, Missouri City, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 654 days.

(21) Appl. No.: 17/312,739

(22) PCT Filed: Dec. 13, 2019

(86) PCT No.: PCT/US2019/066277
§ 371 (c)(1),
(2) Date: Jun. 10, 2021

(87) PCT Pub. No.: WO2020/123973
PCT Pub. Date: Jun. 18, 2020

(65) Prior Publication Data
US 2022/0049027 A1 Feb. 17, 2022

Related U.S. Application Data

(60) Provisional application No. 62/779,595, filed on Dec. 14, 2018.

(51) Int. Cl.
*C08F 10/02* (2006.01)
*B01J 19/00* (2006.01)
(Continued)

(52) U.S. Cl.
CPC .......... *C08F 10/02* (2013.01); *B01J 19/0013* (2013.01); *B01J 19/2445* (2013.01);
(Continued)

(58) Field of Classification Search
CPC ................. B01J 19/245; B01J 19/2465; B01J 2219/00159; C08F 6/003
(Continued)

(56) References Cited

U.S. PATENT DOCUMENTS 4,444,922 A 4/1984 Gutowski et al.
4,616,937 A 10/1986 King
(Continued)

FOREIGN PATENT DOCUMENTS

CN 104024219 A 9/2014
EP 2072540 A1 * 6/2009 ................ C08F 6/10
(Continued)

OTHER PUBLICATIONS

International Search Report for International Application Serial No. PCT/US2019/066277; International Filing Date Dec. 13, 2019; Report Mail Date Apr. 14, 2020 (5 pages).
Written Opinion for International Application Serial No. PCT/US2019/066277; International Filing Date Dec. 13, 2019; Report Mail Date Apr. 14, 2020 (8 pages).

*Primary Examiner* — Fred M Teskin
(74) *Attorney, Agent, or Firm* — CANTOR COLBURN LLP

(57) ABSTRACT

Disclosed herein too is a method comprising charging to a reactor system a feed stream comprising a catalyst, a monomer and a solvent; reacting the monomer to form a polymer; where the polymer is contained in a single phase polymer solution; transporting the polymer solution to a pre-heater to increase the temperature of the polymer solution; charging the polymer solution to a liquid-liquid separator; reducing a pressure of the polymer solution in the liquid-liquid sepa-
(Continued)

rator and separating a polymer-rich phase from a solvent-rich phase in the liquid-liquid separator; transporting the polymer-rich phase to a plurality of devolatilization vessels located downstream of the liquid-liquid separator, where each devolatilization vessel operates at a lower pressure than the preceding devolatilization vessel; and separating the polymer from volatiles present in the polymer rich phase.

16 Claims, 2 Drawing Sheets

(51) Int. Cl.
    *B01J 19/24*     (2006.01)
    *C08F 6/10*     (2006.01)

(52) U.S. Cl.
    CPC ......... *B01J 19/245* (2013.01); *B01J 19/2465* (2013.01); *B01J 2219/00159* (2013.01); *B01J 2219/00162* (2013.01)

(58) Field of Classification Search
    USPC ........................................................ 528/501
    See application file for complete search history.

(56) References Cited

U.S. PATENT DOCUMENTS

| | | |
|---|---|---|
| 4,753,535 A | 6/1988 | King |
| 4,808,007 A | 2/1989 | King |
| 6,255,410 B1 | 7/2001 | Shigekauzu et al. |
| 6,660,812 B2 | 12/2003 | Kuechler et al. |
| 7,601,666 B2 | 10/2009 | Rix et al. |
| 8,969,614 B2 | 3/2015 | Binder et al. |
| 9,138,713 B2 | 9/2015 | Wang |
| 2008/0033127 A1 | 2/2008 | Jiang et al. |
| 2008/0153996 A1 | 6/2008 | Friedersdorf et al. |
| 2015/0203705 A1 | 7/2015 | Olson et al. |
| 2016/0282251 A1 | 9/2016 | Wang et al. |

FOREIGN PATENT DOCUMENTS

| | | |
|---|---|---|
| WO | 0234795 A1 | 5/2002 |
| WO | 2006002132 A2 | 1/2006 |
| WO | 2006009942 A1 | 1/2006 |
| WO | 2008076589 A1 | 6/2008 |
| WO | 2011008955 A1 | 1/2011 |
| WO | 2016204874 A1 | 12/2016 |

\* cited by examiner

SOLUTION POLYMERIZATION PROCESS

CROSS REFERENCE TO RELATED APPLICATIONS

This application is a National Stage application of PCT/US2019/066277, filed Dec. 13, 2019, which claims the benefit of U.S. Provisional Application No. 62/779,595, filed Dec. 14, 2018, both of which are incorporated by reference in their entirety herein.

BACKGROUND

This disclosure relates to a solution polymerization process. In particular, this disclosure relates to a solution polymerization process that uses a high pressure reactor coupled with thermal activation and a liquid-liquid separator.

A polymer solution can exhibit Lower Critical Solution Temperature (LCST) phenomenon, whereby a homogeneous polymer solution separates into a polymer-rich liquid phase and a solvent-rich phase above a certain temperature. This temperature is a function of solvent type, polymer stream composition and pressure. Any of these variables can be manipulated to a induce liquid-liquid separation. This separation has very small heat duty associated with it, especially compared to the vaporization of an equivalent amount of solvent. In commercial solution polymerizations, there is a need to increase efficiency and reduce costs associated with solvent removal processes.

U.S. Pat. No. 6,881,800 to Friedersdorf relates to processes and plants for continuous solution polymerization. The plant includes a pressure source; a polymerization reactor, downstream of said pressure source; a pressure let-down device located downstream of the polymerization reactor; and a separator that is located downstream of the pressure let-down device. The pressure source is disclosed as sufficient to provide pressure to the reaction mixture during polymerization to produce a single-phase liquid reaction mixture in the reactor, and a two-phase liquid-liquid reaction mixture in the separator, in the absence of an additional pressure source between the reactor and the separator. This process discloses the use of a heater to heat the reactor outlet stream, prior to inducing liquid-liquid phase separation. Since the solution coming out of the reactor has more solvent per pound of polymer than that coming out of the separator, heating prior to the separator significantly increases the heat duty per pound of polymer.

International Publication No. WO 2008/076589 to Friedersdorf et al. discloses a process for polymerizing olefins in a dense fluid, homogeneous polymerization system. The process comprises (a) contacting, in one or more reactors, olefin monomers having three or more carbon atoms present at 30 weight percent, or more, with the following: 1) one or more catalyst compounds, 2) one or more activators, 3) from 0 to 50 mole percent comonomer, and 4) 0 to 40 weight percent diluent or solvent; (b) forming a reactor effluent comprising the polymer-monomer mixture; (c) optionally heating the polymer-monomer mixture of (b), after it exits the reactor, and before, or after, the pressure is reduced in step (e); (d) collecting the polymer-monomer mixture of (b) in a separation vessel; (e) reducing the pressure of the reactor effluent comprising the polymer-monomer mixture of (b) below the cloud point pressure to form a two-phase mixture comprising a polymer-rich phase and a monomer rich phase, either before, or after, collecting the polymer-monomer mixture in the separation vessel. The pressure in the reactor is from 7 to 100 MPa higher than the pressure in the separation vessel, and the temperature in the separation vessel is above the higher of the crystallization temperature of the polymer, or above 80° C., if the polymer has no crystallization temperature. The monomer-rich phase is separated from the polymer-rich phase, and recycled to one or more reactors. This patent discloses that a reactor pressure used to run this process with less than 40 weight percent solvent is high (up to 200 MPa), to ensure a supercritical polymerization medium. This high pressure makes the reactor operation challenging, and necessitates the use of thick walled reactors which reduced capital and energy efficiency.

U.S. Pat. No. 6,255,410 to Shigekauzu et al. discloses a process for producing polyolefins at pressures substantially below conventional high pressure conditions in two-phase systems. The process comprises (a) continuously feeding olefinic monomer and catalyst system of metallocene and cocatalyst; (b) continuously polymerizing the monomer feed to provide a monomer-polymer mixture; and (c) continuously settling a two phase mixture into a continuous molten polymer phase and a continuous monomer vapor, the latter of which may, optionally, be at least partly recycled to (a). In (b), the mixture is at a pressure below the cloud point pressure to provide a polymer-rich phase and a monomer-rich phase at a temperature above the melting point of the polymer, and the polymerization takes place at a temperature and a pressure, where the catalyst system productivity exceeds that which is obtained at twice the pressure above the cloud point at that temperature. This patent discloses only minor amounts of solvent, as required for a catalyst carrier, and does not have the advantages of using lower temperatures and pressures associated with solution polymerization processes.

The polymerization processes described in the above references are typically energy intensive, requiring heat exchanges between the polymerization reactor and the separator, supercritical polymerization conditions, and/or additional polymer-solvent separation means. There is a need to develop new polymerization processes that use solvent separation means that utilize less energy and have increased efficiency and reduced costs. There is also a need to eliminate ancillary and energy intensive devices thereby reducing capital and operating costs.

SUMMARY

Disclosed herein is a system for solution polymerization comprising a reactor system that is operative to receive a monomer, a catalyst and a solvent, and to react the monomer to form a polymer; a pre-heater located downstream of the reactor system, where the pre-heater is operative to receive a polymer solution from the reactor system and to heat the polymer solution to a temperature greater than its lower critical solution temperature; a liquid-liquid separator that is operative to receive a polymer solution from the pre-heater and to facilitate a separation between the polymer and volatiles by reducing the pressure and/or the temperature of the polymer solution to below the lower critical solution temperature of the polymer solution; where the polymer is present in a polymer-rich phase and the volatiles are present in a solvent-rich phase; and a plurality of devolatilization vessels located downstream of the reactor system, where each devolatilization vessel operates at a lower pressure than the preceding devolatilization vessel and wherein the plurality of devolatilization vessels receives the polymer-rich phase from the reactor system and separates polymer from the volatiles.

Disclosed herein too is a method comprising charging to a reactor system a feed stream comprising a catalyst, a monomer and a solvent; reacting the monomer to form a polymer; where the polymer is contained in a single phase polymer solution; transporting the polymer solution to a pre-heater to increase the temperature of the polymer solution; charging the polymer solution to a liquid-liquid separator; reducing a pressure of the polymer solution in the liquid-liquid separator and separating a polymer-rich phase from a solvent-rich phase in the liquid-liquid separator; transporting the polymer-rich phase to a plurality of devolatilization vessels located downstream of the liquid-liquid separator, where each devolatilization vessel operates at a lower pressure than the preceding devolatilization vessel; and separating the polymer from volatiles present in the polymer rich phase.

DETAILED DESCRIPTION

Figure 1:
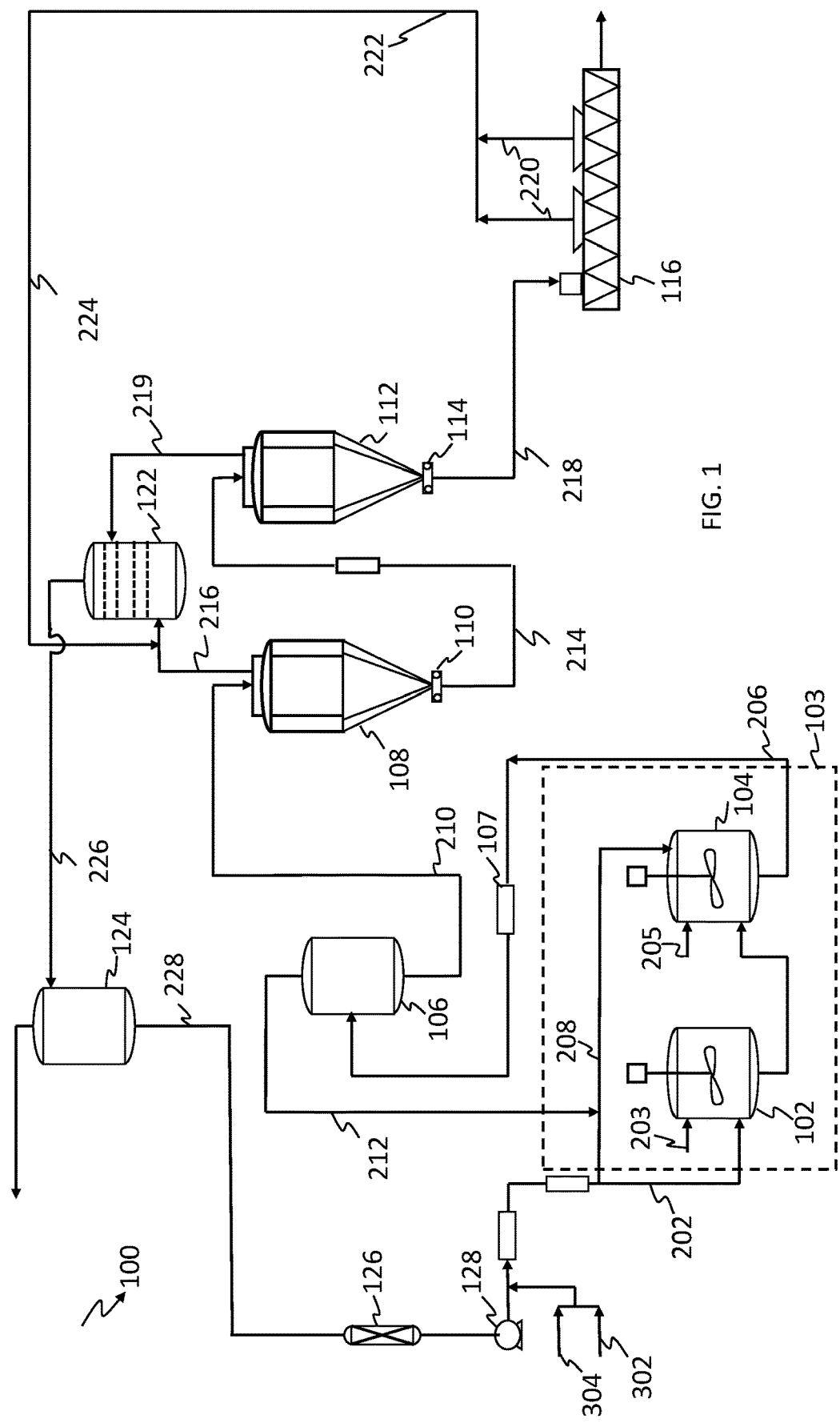
FIG. 1 depicts an exemplary embodiment of the system used to solution polymerize monomers to form a polymer.

The term "continuous stirred-tank reactor," or "CSTR," as used herein, refers to a tank reactor to which reactants are continuously fed and product is continuously withdrawn. The CSTR is mechanically agitated such that there is a close approximation of perfect back mixing.

The term "boiling reactor," as used herein, refers to a reactor operated at conditions such that both a liquid phase and a vapor phase are present. At least part of the solvent and monomer introduced into the reactor as a liquid are vaporized and exit the reactor as a vapor, thereby removing part of the heat of polymerization which results in a higher polymer concentration, as compared to an adiabatic reactor, in the liquid stream that exits the reactor. The vapor stream that exits the reactor is cooled and recycled to the reactor. Any liquid that is condensed in this cooling process is also recycled to the reactor. These reactors are typically well mixed and can be mixed simply by the introduction of the vapor recycle stream; however the mixing can be augmented by means of mechanical agitation. The boiling reactor can be used by itself or in combination with other boiling reactors, CSTRs, loop reactors, or any other reactor for making polyolefins, and can be a single or multi-stage reactor.

A variation of the CSTR is the loop reactor which comprises a conduit through which process fluids are recirculated. Often it also contains one or multiple heat exchangers, a recirculation pump, and an injection device for reactants and catalyst. The heat exchangers in the loop reactors can be shell and tube, shell and tube with mixing element inserts, plate and frame, or flat plate type exchangers.

The term "tubular reactor" is meant to describe a reactor that is in the shape of a simple tube. The tubular reactor of this invention will have a length/diameter (L/D) ratio of at least 10/1. The tubular reactor may or may not be agitated. The tubular reactor may be operated adiabatically or isothermally. When operated adiabatically, as polymerization progresses, the remaining comonomer is increasingly consumed and the temperature of the solution increases (both of which improve the efficiency of separating the remaining comonomer from the polymer solution). It is especially preferred that the temperature increase along the length of the tubular reactor is greater than 3° C. (i.e., that the discharge temperature from the tubular reactor is at least 3° C. greater than the discharge temperature from the reactor that feeds the tubular reactor).

The tubular reactor used in this disclosure may have a feed port for additional ethylene, hydrogen, and solvent. The feed may be "tempered"—i.e., the temperature of the additional ethylene, hydrogen, and/or solvent is heated to above ambient (preferably to about 100° C.) but the temperature is below the discharge temperature of the tubular reactor. In an embodiment, the ethylene is tempered to between 10° and 200° C. It is also desirable to add the ethylene and hydrogen with solvent. The amount of solvent (expressed as a weight ratio, based on ethylene) is preferably from 10/1 to 0.1/1, especially from 5/1 to 1/1.

The term "adiabatically flashed," as used herein, refers to a flashing step in which no heat is added to the polymer solution between the reactor or reactors and the flashing vessel.

By "substantially uniform," as used with respect to a dimension (such as width or height) or a cross-sectional area of zone within a heating channel, is meant that the same is either not converging nor diverging at all, or is converging and/or diverging by no more than ten percent of the average of that dimension.

The term "solids content" refers to the amount of polymer in the polymer solution. The term "polymer concentration" is used interchangeably with "solids content" when referring to the concentration of the polymer in the polymer solution.

"Polymer" refers to a compound prepared by polymerizing monomers, whether of the same or a different type of monomer. The generic term "polymer" embraces the terms "oligomer," "homopolymer," "copolymer," "terpolymer" as well as "interpolymer."

"Interpolymer" refers to polymers prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Oligomer" refers to a polymer molecule consisting of only a few monomer units, such as a dimer, trimer, tetramer or a polymer with fewer than 20 carbon atoms in its chain.

Alpha-olefins (or α-olefins) are a family of organic compounds which are alkenes (also known as olefins) with a chemical formula $CxH_{2x}$, distinguished by having a double bond at the primary or alpha (a) position.

"Bubble point pressure" means the pressure at which the first bubble of vapor is formed at a given temperature.

"Polymer solution" means a solution containing a dissolved polymer where the polymer and the volatiles are in a single phase—a liquid phase.

Solution viscosities are measured using an Anton Paar MCR 102 rheometer made by Anton Paar Germany GmbH. The rheometer is equipped with a C-ETD300 electrical heating system. The cup-and-bob system (combination of concentric cylinders) comprises a 27 mm diameter cup and a 25 mm diameter bob to allow for 1 mm gap between the two. The bob is operated in rotational mode inside a 150 bar (approximately 153 kgf/cm$^2$)-pressure cell. Viscosity measurements are obtained at a pressure of 30 bar ((approximately 31 kgf/cm$^2$—obtained with a nitrogen atmosphere), a range of temperatures (150 to 250° C.), a range of polymer concentrations (20 to 90 weight percent), a range of shear rates (0.1 to >100 reciprocal seconds ($s^{-1}$)), and range of polymer molecular weights (15,000 to 200,000 g/mole). The solvent in all cases was ISOPAR™ E by ExxonMobil. The viscosity measurements obtained ranged from 100 to greater than 2,000,000 centipoise.

Disclosed herein is a process for the solution polymerization of α-olefins. The process includes conducting a homogenous polymerization of α-olefins in a hydrocarbon solvent using one or two high-pressure agitated adiabatic reactors to make designed polyethylene and elastomers products. The reactors are operated at low ethylene conversion conditions. The process includes heating the reactor effluent (hereinafter the "polymer solution") to elevated temperatures to deactivate the catalyst without using any polar compounds to kill the catalyst. In order to achieve this, the system utilizes a pre-heater (located upstream of the liquid-liquid separator and downstream of the reactor system) increases the reactor effluent temperature to a value greater than the system lower critical solution temperature. At this temperature, the catalyst is deactivated.

Both the high unreacted ethylene concentration and the pre-heating of reactor effluent facilitated the liquid-liquid separation that resulted in removal of more than 33 wt % of the total solvent.

Disclosed herein too is a system in which the solution polymerization of the α-olefins is conducted. The system comprises one or more reactors in which the α-olefins are polymerized. In an embodiment, the system comprises a plurality of reactors in series with one another that are used for solution polymerization of one or more monomers to produce a polymer-solvent solution (also called the reactor effluent and hereinafter termed the "polymer solution"). At least one of the reactors facilitates the polymerization under adiabatic conditions. The reactors are in fluid communication with a pre-heater, a liquid-liquid separator and a devolatilization system that comprises at least 1 devolatilization vessel, preferably at least 2 devolatilization vessels. Each successive devolatilization vessel operates at a lower pressure than the preceding vessel. The preheater heats the polymer solution temperature to a temperature above the lower solution critical temperature. The temperature of the polymer solution is reduced in the liquid-liquid separator to facilitate a separation of the polymer from the volatiles. The polymer separates into a polymer-rich phase, while the volatiles separate into a solvent-rich phase. This arrangement does not use any anti-solvents to bring about precipitation of the polymer from the volatiles. This arrangement increases the solids content in a polymer stream to at least 92 wt % prior to pelletization, granulation and solidification.

FIG. 1 is a schematic depiction of an exemplary solution polymerization system 100 (hereinafter system 100) that may be used to polymerize a monomer (or a plurality of monomers) to produce a polymer or copolymer. The system 100 comprises a reactor system 103 which can comprise a one or more reactor units (that are arranged either in series or in parallel) in fluid communication with each other. An example of such a reactor system is presented in U.S. Pat. Nos. 4,616,937, 4,753,535 and 4,808,007, the entire contents of which are hereby incorporated by reference.

The reactor system 103 is operative to receive monomers, comonomers, hydrogen, catalyst, initiator, solvent, and the like. In an embodiment, the reactors in the reactor system may be continuous stirred tank reactors (CSTRs), loop reactors (e.g., single loop reactor, double loop reactor), boiling reactors, and can be single or multi-stage reactors. In an embodiment, this process may employ multiple catalysts in one or more reactors.

In an embodiment, when the reactor system employs multiple reactors, these reactors may all be the same type (e.g., all reactors may be loop reactors or all reactors may be continuous stirred tank reactors). In another embodiment, the reactors may be different reactor types (e.g., one reactor may a loop reactor while the other reactor may be a continuous stirred tank reactor) or combinations thereof. In an embodiment, at least one of the reactors is an adiabatic reactor, i.e., no heat is supplied to the reactor during the reaction.

With reference now again to the FIG. 1, the reactor system 103 comprises two reactors—a first reactor 102 and a second reactor 104 that are in series with each other. In a preferred embodiment, the first reactor 102 and the second reactor 104 are both continuous stirred tank reactors. Both reactors are operated under adiabatic conditions. Details of the reactor operation are detailed later.

Located downstream of the reactor system 103 are a plurality of devolatilization vessels in series with one another—a first devolatilization vessel 108 and a second devolatilization vessel 112 that are in fluid communication with the reactor system and with one another. Disposed between the reactor system 102 and the first devolatilization vessel 108 is a preheater 107 and a liquid-liquid separator 106 that is operative to separate some of the solvent and unreacted monomer from the polymer.

The preheater 107 heats the polymer solution emanating from the reactor system 103 to a temperature that is greater than the lower critical solution temperature. The temperature of the polymer solution is reduced to below the lower critical solution temperature in the liquid-liquid separator 106 thus promoting a precipitation of the polymer from the volatiles. A polymer-rich phase is removed from the bottom of the liquid-liquid separator 106, while a solvent-rich phase is removed from the top of the liquid-liquid separator.

A positive displacement pump that facilitates transport of the polymer solution from the devolatilization vessel is located downstream of each of the devolatilization vessels. A first positive displacement pump 110 is located downstream of the first devolatilization vessel 108 with a second positive displacement pump 114 being located downstream of the second devolatilization vessel 112.

In an embodiment, the pumps 110 and 114 are both screw pumps. In another embodiment, the pumps 110 and 114 are both gear pumps. The polymer solution discharged from the second pump 114 is charged to an extruder 116 where the polymer solution now substantially devoid of solvent is pelletized. Solvent and unreacted monomer extracted at the extruder is recycled and charged to the reactor system 103 via condensers 120 and 122.

In an embodiment, in one manner of utilizing the system 100 to produce olefin polymers, α-olefin monomers are charged to the reactor system 103 along with catalyst, initiator, solvents and hydrogen. The reactants such as the α-olefin monomers along with the solvents are introduced into the reaction system 103 via stream 302, while hydrogen is simultaneously introduced into the reaction system 103 via stream 304.

In an embodiment, the α-olefin monomer may comprise only ethylene. In another embodiment, the α-olefin monomer may comprise ethylene along with an α-olefin comonomer that has 3 to 12 carbon atoms. Illustrative examples of such alpha-olefin comonomers are one or more of propylene, 1-butene, 1-pentene, 1-hexene, 1-octene and 1-decene. 1-octene is preferred.

The feed solvent in addition to solubilizing the polymer serves as a heat sink to absorb the heat of reaction. Examples of inert hydrocarbon solvents include a $C_{5-12}$ hydrocarbon which may be unsubstituted or substituted by a $C_{1-4}$ alkyl group such as pentane, methyl pentane, hexane, heptane, octane, cyclohexane, methyl cyclohexane, hydrogenated naphtha, or a combination thereof. A preferred solvent is methyl cyclohexane.

The weight ratio of solvent to monomer in the stream 202 (which feeds the reactants to the reactor system 103) is 5 to 10. In a preferred embodiment, the weight ratio of solvent to monomer in the stream 202 is 6 to 8.

The monomers are mixed with hydrogen and dissolved/dispersed in the solvent prior to being fed to the reactor system 103. Prior to mixing, the solvent and monomers (sometimes referred to as "feedstock") are generally purified to remove potential catalyst poisons such as water, oxygen, or other polar impurities. The feedstock purification may employ molecular sieves, alumina beds or oxygen removal catalysts. The solvent may also be purified in a similar manner. The feeds to the reactor system 103 are generally cooled down to a temperature of less than 40° C., preferably less than 20° C. The cooling of the feed can facilitate a reduction in heat exchanger size in the reactor system. The cooling can be conducted either in the reactor system or prior to entry into the reactor system. In a preferred embodiment, the cooling of the feed can be conducted prior to entry into the reactor system.

In an embodiment, the catalyst may be premixed in the solvent for the reaction or fed as separate streams to one or multiple reactors in the reactor system 103. In an embodiment, some or all of the catalyst is introduced into the first reactor 102 via stream 203, while additional catalyst may be added to the second reactor 104 via stream 205. Catalysts used can be Ziegler-Natta catalysts, bis-metallocene catalysts, constrained geometry catalysts, a polyvalent aryloxyether complex, a phosphinimine, or a combination thereof.

In an embodiment, the first reactor 102 operates at a pressure of greater than or equal to 105 kgf/cm$^2$, preferably greater than or equal to 110 kgf/cm$^2$, and more preferably greater than or equal to 115 kgf/cm$^2$. In an embodiment, the first reactor 102 operates at a pressure of less than or equal to 200 kgf/cm$^2$, preferably less than or equal to 195 kgf/cm$^2$, and more preferably less than or equal to 180 kgf/cm$^2$. In a preferred embodiment, the first reactor 102 operates at a pressure of 130 kgf/cm$^2$ to 155 kgf/cm$^2$. In an embodiment, the first reactor 102 operates at temperatures ranging from 120 to 230° C. In an embodiment, the polymer solution exiting the first reactor 102 can have temperatures of 130 to 240° C., preferably 150 to 170° C.

The polymer (solids content) is present in the polymer solution in an amount of 8 to 16 wt %, preferably 9 to 15 wt %, and more preferably 11 to 13 wt %, at the exit of the first reactor 102. The weight percent (wt %) is based on the total weight of the polymer stream. Melt indices $I_2$ (or I2) and $I_{10}$ (or I10), for ethylene-based polymers, are measured in accordance with ASTM D-1238 (method B) at 190° C. and at 2.16 kg and 10 kg load, respectively. Their values are reported in g/10 min. The melt index ratio (also called a melt flow ratio) $I_{10}/I_2$ is the ratio of the two values and it is dimensionless. The melt index ratio of the polymer at the exit of the first reactor 102 can range from 0.1 to 1500.

In an embodiment, the viscosity of the polymer solution exiting the first reactor 102 is 50 to 11,000 centipoise when measured as detailed above. Samples for density measurement are prepared according to ASTM D4703. Measurements are made, according to ASTM D792, Method B, within one hour of sample pressing.

In an exemplary embodiment, the product exiting the first reactor 102 has density of 0.865 to 0.920 g/cm$^3$, a melt index 12 of 0.25 to 210.0 g/10 minutes, and a melt flow ratio of $I_{10}/I_2$ of 6.0 to 8.5. At a reactor temperature of 160° C. and polymer concentration of 12 wt %, the solution viscosity at the reactor system exit is expected to be at least 350 centipoise, measured as detailed above.

The second reactor 104 operates at a higher temperature than the first reactor 102. In an embodiment, the second reactor operates at a lower pressure than the first reactor 102. The second reactor 104 is operative to increase the solids content in the polymer stream by an amount of more than 10 wt %, preferably more than 15 wt %, preferably more than 20 wt %, and more preferably more than 25 wt %, relative to the solids content of the polymer stream emanating from the first reactor 102.

In an embodiment, the monomer content in the polymer stream that is fed to the liquid-liquid separator is greater than at least 5 wt %, based on the total weight of the polymer solution stream entering the liquid-liquid separator. The presence of at least 5 wt % monomer in the liquid-liquid separator feed stream (i.e., the polymer solution stream) facilitates phase separation of the polymer from the solvent when the polymer solution is at a lower temperature than the lower critical solution temperature. As noted above, the monomer comprises α-olefins. In a preferred embodiment (as noted below), the α-olefin monomer present in the polymer stream that is fed to the liquid-liquid separator is ethylene.

In an embodiment, the ethylene content (which reflects the ethylene concentration in the stream feeding the liquid-liquid separator) is greater than at least 5 wt %, based on the total weight of the polymer solution stream entering the liquid-liquid separator. The presence of at least 5 wt % ethylene in the liquid-liquid separator feed stream facilitates phase separation of the polymer from the solvent when the polymer solution is at a lower temperature than the lower critical solution temperature.

In an embodiment, the solids content emanating from the second reactor 104 is 12 to 20 wt %, preferably 14 to 18 wt %, and more preferably 15 to 17 wt %, based on the total weight of the polymer stream.

The second reactor 104 operates at a pressure of greater than or equal to 100 kgf/cm$^2$, preferably greater than or equal to 105 kgf/cm$^2$, and more preferably greater than or equal to 110 kgf/cm$^2$. In an embodiment, the second reactor 104 operates at a pressure of less than or equal to 180 kgf/cm$^2$, preferably less than or equal to 175 kgf/cm$^2$, and more preferably less than or equal to 155 kgf/cm$^2$. In a preferred embodiment, the second reactor 102 operates at a pressure of 120 kgf/cm$^2$ to 135 kgf/cm$^2$.

The second reactor 104 operates at a higher temperature than the first reactor. The second reactor has a temperature that is at least 25% higher, preferably at least 30% higher and more preferably at least 35% higher than the temperature of the first reactor 102. In an embodiment, the second reactor 104 operates at a temperature ranging from 180 to 250° C. In an embodiment, the polymer solution exiting the second reactor 104 can have temperatures of 190 to 230° C., preferably 200 to 220° C., and more preferably 208 to 214° C.

The polymer solution is then transferred from the reactor system 103 to the pre-heater 107. The pre-heater heats the polymer solution to a temperature that is greater than the lower critical solution temperature of the polymer solution. In an embodiment, the pre-heater heats the polymer solution to a temperature of greater than or equal to about 250° C., preferably greater than or equal to about 255° C. In an embodiment, the preheater heats the polymer solution to a temperature of 260° C.

Figure 2:
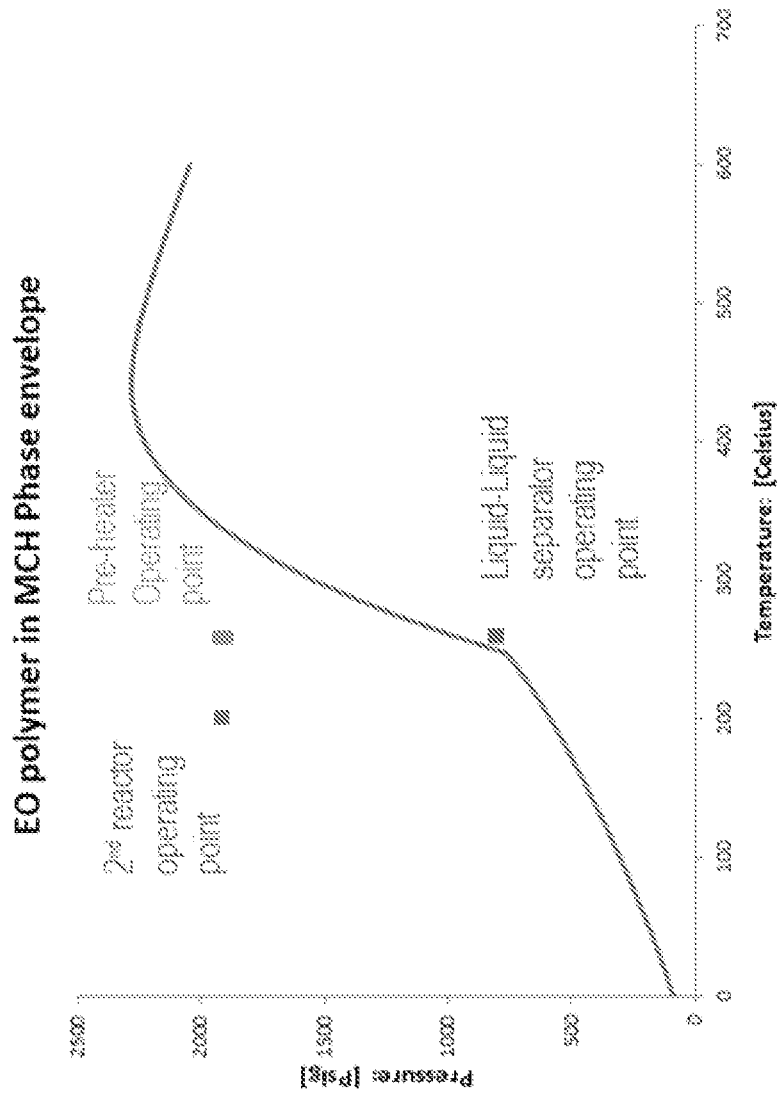
FIG. 2 depicts a pressure-temperature graph that illustrates the effect of the pre-heater on the system properties.

The polymer solution emanating from the pre-heater 107 is then charged to a liquid-liquid separator 106. The pressure of the polymer solution from the second reactor is reduced to below 70 kgf/cm$^2$ in the liquid-liquid separator from the outlet pressure of the second reactor 104 (which is 120 kgf/cm$^2$ to 135 kgf/cm$^2$). FIG. 2 depicts a pressure-temperature graph that illustrates the effect of the pre-heater on the system properties. The second reactor operating point is at a temperature of 200° C. and a pressure of 1800 pounds per square inch (about 126 kgf/cm$^2$). The pre-heater increases the temperature of the polymer solution as a result of which the system temperature is increased to about 250° C. (see the pre-heater operating point in the FIG. 2). Once the polymer solution is charged to the liquid-liquid separator, the pressure is dropped to about 930 psi (about 65 kgf/cm$^2$). The liquid-liquid separator operating point is below the lower critical solution temperature and as a result the polymer solution segregates into a polymer-rich phase and a solvent-rich phase, which is discussed in further detail below.

It is to be noted that while the FIG. 2 shows that a pressure drop brings the polymer solution to a point below the lower critical solution temperature, in some cases a reduction in temperature, or alternatively, a reduction in both pressure and temperature may bring the system to a point below the lower critical solution temperature. In short, a reduction in pressure, temperature, or both temperature and pressure may facilitate bringing the polymer solution to a point below the lower critical solution temperature, where a single phase solution separates into a two phase system-the polymer-rich phase and the solvent-rich phase.

The liquid-liquid separator facilitates a separation of the polymer from the volatiles by reducing the pressure, temperature, or both the pressure and the temperature of the polymer solution. In an embodiment, the pressure is reduced to 65 kgf/cm$^2$ or below, preferably to 60 kgf/cm$^2$ or below, in the liquid-liquid separator 106. The reduction in pressure in the liquid-liquid separator 106 facilitates moving the polymer solution to below the lower critical solution temperature, where the polymer solution separates into a polymer-rich phase and a solvent-rich phase.

With the second reactor operating at least 250° C., the reactor effluent (i.e., the polymer solution) is above the system lower critical solution temperature that is capable of inducing liquid-liquid separation without any additional energy input. By reducing the pressure to less than 60 kgf/cm$^2$ in the liquid-liquid separator, liquid-liquid separation is facilitated, since the polymer solution is displaced into the liquid-liquid regime, but remains above the bubble point pressure of the system (which is approximately about 56 kgf/cm$^2$). The displacement of the polymer solution to below the lower critical solution temperature promotes the polymer solution to separate into a solvent-rich phase and a polymer-rich phase. The polymer-rich phase segregates to the bottom of the liquid-liquid separator, while the solvent-rich phase lies atop the polymer-rich phase. The polymer-rich phase is removed from the bottom of the liquid-liquid separator and transported to the first devolatilization vessel 108 via stream 210. In an embodiment, the stream 210 emanating from the liquid-liquid separator has at least 25% more solids than the stream 206 emanating from the second reactor 104. Stream 210 contains 20 to 24 wt % solids, based on the total weight of the polymer solution removed from the bottom of the separator.

The solvent-rich phase is removed via stream 212 and is recycled into the reactor system 103 via stream 208. In an embodiment, the solvent-rich phase is recycled to the second reactor 104. The use of a liquid-liquid separator results in a removal of at least 33% of the volatiles (solvents and monomer) from the polymer solution at the liquid-liquid separator. As no polar compounds are introduced into the polymer stream prior to the liquid-liquid separator, the solvent-rich stream exiting the liquid-liquid separator can be sent back to the reactor feed section directly without the need to put it through any additional purification steps.

The polymer solution (the polymer-rich stream) is then discharged to a devolatilization system that comprises a series of devolatilization vessels—the first devolatilization vessel 108 and the second devolatilization vessel 112, both of which are in serial fluid communication with one another. The first devolatilization vessel 108 is located upstream of the second devolatilization vessel 112. Each sequential devolatilization vessel operates at a lower pressure than the preceding vessel and each devolatilization vessel facilitates adiabatic flashing of the solvent from the polymer solution, leaving behind a polymer solution that has a higher polymer concentration than that prior to the flashing.

The polymer solution comprises about 20 to 24 wt % solids, preferably 21 to 23 wt % solids at the point of entry into the first devolatilization vessel 108. In the first devolatilization vessel 108, the polymer solution is subjected to a flash where at least 60 wt % of the solvent is removed so that the solution is concentrated to at least 60 wt % polymer, preferably at least 65 wt %, based on the total weight of the polymer solution. In an embodiment, the flashing is conducted adiabatically.

In one embodiment, the first devolatilization vessel 108 operates adiabatically to facilitate solvent removal from the polymer solution. In one embodiment, the pressure in the first devolatilization vessel is maintained at 6 to 12 kgf/cm$^2$, preferably 8 to 10 kgf/cm$^2$, thus permitting the solvent to flash off and to increase the polymer content in the polymer solution to 45 to 90 wt %, preferably 50 to 70 wt %, based on the total weight of the polymer solution leaving the first devolatilization vessel via stream 214. In an embodiment, at least 50 wt %, preferably at least 55 wt % of the solvent present in the polymer solution (at the time of entry into the first devolatilization vessel 108) is flashed off. The flashed solvent is removed from the first devolatilization vessel 108 via line 216 to a condensation tank 122, from which it is recycled back to the reactor system 103 via streams 226 and 228.

The temperature of the polymer solution leaving the first devolatilization vessel 108 is 170° C. to 220° C. and its pressure is at 2 to 12 kgf/cm$^2$. The polymer solution exiting the first devolatilization vessel 108 contains polymer in an amount of 50 to 90 wt %, based on the total weight of the polymer solution that exits the first devolatilization vessel 108. In an embodiment, the solids content is increased to at least 60 wt % polymer, preferably at least 65 wt %, based on the total weight of the polymer solution leaving the first devolatilization vessel 108.

The polymer solution is then discharged from the first devolatilization vessel 108 via stream 214 to an optional first positive displacement pump 110. The optional first positive displacement pump 110 facilitates increasing the pressure of the polymer solution. This increase in the pressure (brought about by the first optional positive displacement pump 110) facilitates further devolatilization of volatiles (e.g., solvents and unreacted monomer) from the polymer solution when it is adiabatically flashed in the second devolatilization vessel 112 to increase the solids concentration to an amount greater than 90 wt %, preferably greater than 92 wt %, and more preferably greater than 95 wt %, based on the total weight of the polymer solution leaving the second devolatilization vessel 112.

The second devolatilization vessel 112 may also operate adiabatically to facilitate solvent removal from the polymer solution. In one embodiment, the polymer solution entering the second devolatilization vessel 112 (See FIG. 1) is at a temperature of 210 to 260° C., preferably 220 to 240° C.

In one embodiment, the pressure in the second devolatilization vessel is maintained at 0.5 to 1 kgf/cm$^2$ permitting the solvent to flash off and to increase the solids content in the polymer solution to 90 to 97 wt %, preferably 92 to 95 wt %, based on the total weight of the polymer solution at the exit of the second devolatilization vessel 112. The temperature of the polymer solution leaving the second devolatilization vessel 112 is 180° C. to 240° C., preferably 190 to 230° C.

Volatiles removed from the flashing (of the polymer solution) in the second devolatilization vessel 112 is transported to the condensation vessel 122 via stream 219, from where it is recycled to the reactor system 103 via a solvent recovery vessel 124. Streams 226 and 228 facilitate the transport of the volatiles to the reaction system 103. A heat exchanger 126 and pump 128 are used to raise the temperature and pressure respectively of the volatile stream A second positive displacement pump 114 facilitates charging the polymer solution (with a solvent content of less than 6 wt %, preferably less than 5 wt %) via stream 218 to a granulation and solidification device such as a pelletizer 116 where the polymer is pelletized and packaged for transportation.

Volatiles generated in the two devolatilization vessels 108 and 112 as well as volatiles generated in the pelletizer are transported to a solvent recovery vessel 124 and from there recycled to the reactor system 103. Volatiles from the first devolatilization vessel 108 are transported to the solvent recovery vessel 124 via stream 216 and condensation vessel 122. Volatiles from the second devolatilization vessel 112 are transported to the solvent recovery vessel 124 via stream 219 and condensation vessel 122. Volatiles from the pelletizer 116 are transported via stream 220, 222, 224, 226 and 228 to the solvent recovery vessel 124 and from there recycled to the reactor system 103.

The recycled volatiles along with the feed comprising ethylene and solvent (see stream 302) and hydrogen (see stream 304) are then fed via stream 202 to the reactor system 103. The reaction in the reactor system 103 proceed as detailed above.

The system disclosed herein is advantageous in that liquid-liquid separation is effected by using a low ethylene conversion condition in conjunction with a pre-heater that thermally de-activates the catalyst and raising the system above the system lower critical solution temperature. Reducing pressure effects the liquid-liquid separation. This is accomplished without the use of anti-solvent. The advantage of applying thermal deactivation without adding a catalyst kill compound (to neutralize the catalyst and stop any further reaction) is that the solvent-rich stream exiting the liquid-liquid separator remains a "clean" stream without polar compound, and can be directly sent back to the reactors without the need to put it through additional purification steps.

What is claimed is:

1. A system for solution polymerization comprising:
   a reactor system that is operative to receive a monomer, a catalyst and a solvent, and to react the monomer to form a polymer;
   a pre-heater located downstream of the reactor system, where the pre-heater is operative to receive a polymer solution from the reactor system and to heat the polymer solution to a temperature greater than its lower critical solution temperature to deactivate the catalyst; and wherein no polar compounds are used to kill the catalyst;
   a liquid-liquid separator that is operative to receive a polymer solution from the pre-heater and to facilitate a separation between the polymer and volatiles by reducing the pressure and/or the temperature of the polymer solution to below the lower critical solution temperature of the polymer solution; where the monomer content in the polymer solution entering the liquid-liquid separator is greater than 5 wt % of a total weight of the polymer solution; and where the polymer is present in a polymer-rich phase and the volatiles are present in a solvent-rich phase; and
   a plurality of devolatilization vessels located downstream of the reactor system, where each devolatilization vessel operates at a lower pressure than the preceding devolatilization vessel and wherein the plurality of devolatilization vessels receives the polymer-rich phase from the reactor system and separates polymer from the volatiles.

2. The system of claim 1, where the reactor system comprises a first reactor that operates at a temperature of 120° C. to 230° C. and a pressure of greater than or equal to 90 kgf/cm$^2$ to less than or equal to 200 kgf/cm$^2$.

3. The system of claim 2, where the solids content in the polymer solution is present in an amount of 8 to 16 wt %, based on a total weight of the polymer solution at the exit of the first reactor.

4. The system of claim 2, where the reactor system further comprises a second reactor that operates at a higher temperature and a lower pressure than the first reactor.

5. The system of claim 4, where the second reactor operates at a pressure of greater than or equal to 80 kgf/cm$^2$ to less than or equal to 180 kgf/cm$^2$ and a temperature of 190 to 230° C.

6. The system of claim 5, where the solids content in the polymer solution is present in an amount of 12 to 20 wt %, based on a total weight of the polymer solution at the exit of the second reactor.

7. The system of claim 1, where the pressure and/or temperature in the liquid-liquid separator remains above the bubble point of the polymer solution.

8. The system of claim 1, where a pressure of the polymer solution in the liquid-liquid separator is reduced to less than 65 kgf/cm$^2$ from 180 kgf/cm$^2$ and where a solids content of the polymer solution emanating from the liquid-liquid separator is 20 to 24 wt %.

9. The system of claim 1, where the plurality of devolatilization vessels comprises a first devolatilization vessel that is operative to increase solids content in the polymer stream to at least 60 wt % polymer, based on a total weight of the polymer-rich phase leaving the first devolatilization vessel.

10. The system of claim 1, where the plurality of devolatilization vessels further comprises a second devolatilization vessel that is operative to increase solids content in the polymer stream to at least 90 wt % polymer, based on a total weight of the polymer-rich phase leaving the second devolatilization vessel.

11. The system of claim 1, where the volatiles generated in the plurality of devolatilization vessels are recycled back to the reactor system.

12. The system of claim 1, where the monomer is an α-olefin.

13. The system of claim 12, where the α-olefin is ethylene.

14. A method comprising:
  charging to a reactor system a feed stream comprising a catalyst, a monomer and a solvent;
  reacting the monomer to form a polymer; where the polymer is contained in a single phase polymer solution;
  transporting the polymer solution to a pre-heater to increase the temperature of the polymer solution to deactivate the catalyst; and wherein no polar compounds are used to deactivate the catalyst;
  charging the polymer solution to a liquid-liquid separator;
  reducing a pressure of the polymer solution in the liquid-liquid separator and separating a polymer-rich phase from a solvent-rich phase in the liquid-liquid separator;
  transporting the polymer-rich phase to a plurality of devolatilization vessels located downstream of the liquid-liquid separator, where each devolatilization vessel operates at a lower pressure than the preceding devolatilization vessel; and
  separating the polymer from volatiles present in the polymer rich phase.

15. The method of claim 14, further comprising pelletizing the polymer.

16. The method of claim 15, further comprising recycling volatiles to the reactor system.

* * * * *